US006489385B1

(12) United States Patent
Fujii et al.

(10) Patent No.: US 6,489,385 B1
(45) Date of Patent: Dec. 3, 2002

(54) HIGHLY SATURATED NITRILE COPOLYMER RUBBER, PROCESS FOR THE PRODUCTION THEREOF, HEAT-RESISTANT RUBBER COMPOSITIONS COMPRISING THE RUBBER AND COMPOSITES COMPRISING THE RUBBER AND FIBERS

(75) Inventors: Yoshinori Fujii, Yokohama (JP); Atsumi Ikeda, Kawasaki (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/147,067

(22) PCT Filed: Mar. 31, 1997

(86) PCT No.: PCT/JP97/01099

§ 371 (c)(1),
(2), (4) Date: May 20, 1999

(87) PCT Pub. No.: WO97/36956

PCT Pub. Date: Oct. 9, 1997

(30) Foreign Application Priority Data

Mar. 29, 1996 (JP) ................................. 8-104349

(51) Int. Cl.$^7$ .............................. C08K 5/16; C08L 53/00
(52) U.S. Cl. ..................... 524/186; 524/92; 524/243; 524/257; 524/565; 524/566
(58) Field of Search .......................... 524/186, 92, 243, 524/257, 565, 566

(56) References Cited

U.S. PATENT DOCUMENTS 3,554,964 A   1/1971  Miller ..................... 260/45.95
4,192,790 A * 3/1980  McKinstry et al. ........ 260/31.2
5,432,226 A * 7/1995  Aonuma et al. ............ 524/506

FOREIGN PATENT DOCUMENTS

| EP | 0 061 160 | 9/1982 |
| EP | 0 580 991 | 2/1994 |
| GB | 1359227   | 7/1974 |
| GB | 1508134   | 4/1978 |

* cited by examiner

Primary Examiner—Peter D. Mulcahy
(74) Attorney, Agent, or Firm—Armstrong, Westerman & Hattori, LLP

(57) ABSTRACT

A highly saturated nitrile group-containing copolymer rubber having a Mooney viscosity lowered by 15 points or more by applying a high shearing force thereto in the presence of an aging inhibitor, which has a Mooney viscosity of 5–35 and a weight average molecular weight/number average molecular weight ratio of 3–5, and exhibits an increase in Mooney viscosity of 10 points or fewer while the rubber is allowed to stand in the air at room temperature for 30 days. The viscosity of the copolymer rubber changes only to a minor extent with the lapse of time, and the copolymer rubber has excellent processability and storage stability. The copolymer rubber can be used as a heat-resistant rubber composition comprising the copolymer rubber and other heat-resistant rubber. The copolymer rubber can be used as a composite thereof with a fiber, which has good mechanical strength.

14 Claims, No Drawings

HIGHLY SATURATED NITRILE COPOLYMER RUBBER, PROCESS FOR THE PRODUCTION THEREOF, HEAT-RESISTANT RUBBER COMPOSITIONS COMPRISING THE RUBBER AND COMPOSITES COMPRISING THE RUBBER AND FIBERS

TECHNICAL FIELD

This invention relates to a highly saturated nitrile group-containing copolymer rubber with an enhanced processability having a Mooney viscosity lowered by imparting thereto a high shearing stress; a process for producing the same; a composition comprising the nitrile group-containing copolymer rubber with a lowered Mooney viscosity and a heat-resistant rubber; and a composite of the highly saturated nitrile group-containing copolymer rubber with a fiber.

BACKGROUND ART

A highly saturated nitrile group-containing copolymer rubber, i.e., a hydrogenation product of an unsaturated nitrile-conjugated diene copolymer rubber, is known as having excellent heat resistance, oil resistance and weather resistance. A vulcanizate having reinforcing fibers integrated therewith by imparting high tenacity characteristics thereto also is known. The rubber used for the fiber-reinforced rubber vulcanizate must have good fluidity or processability so that the rubber penetrates into and thoroughly filled in voids among the reinforcing fibers to give a vulcanizate having sufficiently high tenacities.

To impart a good processability to a highly saturated nitrile copolymer rubber, a process has been proposed wherein its Mooney viscosity is lowered by applying a high shearing force to the rubber (Japanese Unexamined Patent Publication No. H3-122103). The proposed process comprises imparting a high shearing stress to a hydrogenated nitrile rubber with a Mooney viscosity of from 55 to 100 in the presence of an oxygen donor such as oxygen or a peroxide compound and a radical transferring agent whereby the rubber is subject to thermal-oxidative degradation so that the Mooney viscosity is reduced to a value of from 30 to 50.

In the proposed process, free radicals generated upon the thermal-oxidative degradation are stabilized by an oxygen donor. It has been found that the rubber gels due to peroxides, a carboxyl group and carbonyl group, remaining after the high-shearing-force applying treatment. Even if a conventional aging inhibitor is added to the rubber after the high-shearing-force applying treatment, the Mooney viscosity increases during storage of the rubber.

DISCLOSURE OF INVENTION

The object of the present invention is to provide a highly saturated nitrile group-containing rubber, which has a Mooney viscosity reduced by applying a high shearing force thereto and exhibits an enhanced processability, and, which has a good stability and exhibits a reduced increase in viscosity during storage after the high-shearing-force applying treatment; a process for producing the rubber having such good processability; a heat-resistant rubber composition having a good processability; and a composite of the rubber having a good processability with a fiber.

In one aspect of the present invention, there is provided a highly saturated nitrile group-containing copolymer rubber having a Mooney viscosity lowered by 15 points or more by applying a high shearing force thereto in the presence of an aging inhibitor, which has a Mooney viscosity of from 5 to 135 and a ratio of weight average molecular weight (Mw) to number average molecular weight (Mn) of 3 to 5, and exhibits an increase in Mooney viscosity of 10 points or fewer while the rubber is allowed to stand in the air at room temperature for 30 days after the above-lowering of Mooney viscosity.

In another aspect of the present invention, there is provided a process for producing a highly saturated nitrile group-containing copolymer rubber having a low Mooney viscosity, wherein a high shearing force is applied to a highly saturated nitrile group-containing copolymer rubber to lower the Mooney viscosity thereof, characterized in that the application of high shearing force is carried out in the presence of an aging inhibitor.

In still another aspect of the present invention, there is provided a heat-resistant rubber composition comprising the above-mentioned highly saturated nitrile group-containing copolymer rubber with a reduced Mooney viscosity, and a heat-resistant rubber, characterized in that the amount of the highly saturated nitrile group-containing copolymer rubber is at least 5% by weight.

In a further aspect of the present invention, there is provided a composite of the above-mentioned highly saturated nitrile group-containing copolymer rubber with a reduced Mooney viscosity, and a fiber.

BEST MODE FOR CARRYING OUT THE INVENTION

The invention will be in detail described in the following.

Highly Saturated Nitrile Group-Containing Nitrile Rubber

The highly saturated nitrile group-containing copolymer rubber of the present invention, to be subjected to a high-shearing-force-applying treatment according to the invention, is a rubber made by hydrogenating carbon-to-carbon double bonds in an unsaturated nitrile group-containing copolymer rubber, which is a copolymer of an ethylenically unsaturated nitrile such as acrylonitrile, methacrylonitile or á-chloroacrylontrile with a conjugated diene such as 1,3-butadiene, isoprene, 1,3-pentadiene or 2,3-dimethyl-1,3-butadiene, or a copolymer of such ethylenically unsaturated nitrile and conjugated diene with at least one other copolymerizable monomer such as, for example, a vinylaromatic compound such as styrene, acrylic acid, methacrylic acid, an alkyl acrylate, an alkyl methacrylate, an alkoxyalkyl acrylate, an alkoxyalkyl methacrylate, a cyanoalkyl acrylate or a cyanoalkyl methacrylate.

More specifically the highly saturated nitrile group-containing copolymer rubber is made by hydrogenating at least 70%, preferably at least 90% of the carbon-to-carbon double bonds of an unsaturated nitrile group-containing copolymer comprising.usually 10 to 60% by weight, preferably 30 to 50% by weight of ethylenically unsaturated nitrile monomer units, usually 40 to 90% by weight of conjugated diene monomer units, and 0 to 50% by weight of optional copolymerizable monomer units. If the content of ethylenically unsaturated nitrile monomer units in the unsaturated nitrile group-containing copolymer is smaller than 10% by weight, the resulting rubber has a poor oil resistance. In contrast, if the content of ethylenically unsaturated nitrile monomer units is larger than 60% by weight, the resulting rubber has a poor elasticity. If the content of unhydrogenated carbon-to-carbon double bonds in the hydrogenated copolymer exceeds 30% by weight, the resulting rubber has poor tenacity characteristics. The highly saturated nitrile group-containing copolymer generally has good oil resistance, heat resistance and weather resistance.

As specific examples of the highly saturated nitrile group-containing copolymer rubber, there can be mentioned a hydrogenated acrylonitrile-butadiene copolymer rubber, a hydrogenated acrylonitrile-isoprene copolymer rubber, a hydrogenated acrylonitrile-butadiene-acrylate copolymer rubber and a hydrogenated acrylonitrile-butadiene-acrylate-methacrylic acid copolymer rubber.

The highly saturated nitrile group-containing copolymer rubber usually has a Mooney viscosity $ML_{1+4}(100°$ C.) of from 60 to 150, preferably from 80 to 100, as measured before the application of a high shearing force (which is hereinafter referred to as "high Mooney-viscosity highly saturated nitrile group-containing copolymer rubber", when appropriate), and further has an iodine value of not larger than 120, preferably not larger than 60 and more preferably not larger than 30.

Aging Inhibitor

A low Mooney highly saturated nitrile group-containing copolymer rubber with a lowered Mooney viscosity of the invention having a good processability is prepared by applying a high shearing force to the high-Mooney-viscosity highly saturated nitrile group-containing copolymer rubber in the presence of an aging inhibitor to thereby reduce its Mooney viscosity $ML_4$.

The aging inhibitor used in the invention is an organic compound exhibiting a function of changing a rubber radical or rubber hydroperoxy radical, which is produced by oxidation of rubber, to a type incapable of being subject to an oxidative chain transfer reaction, or changing a hydroperoxide to a stable alcohol type, and thus, in a rubber industry, the aging inhibitor is used for preventing aging of rubber and enhancing durability thereof.

The aging inhibitor used in the invention is usually selected from aromatic secondary amine-type, amine-ketone-type, mercaptobenzoimidazole-type, bisphenol-type, monophenol-type, thio-bisphenol-type, hydroquinone-type, nickel salt-type, thiourea-type, thio-ether-type and phosphorus-type aging inhibitors. Of these, aromatic secondary amine-type, amine-ketone type, mercaptobenzoimidazole-type and bisphenol-type aging inhibitors are preferable.

The aromatic secondary amine-type aging inhibitors are secondary amines having a nitrogen atom to which an aromatic ring is bonded. As specific examples of the aromatic secondary amine- type aging inhibitors, there can be mentioned diarylamine aging inhibitors such as octylated diphenylamine, alkylated diphenylamine, 4,4'-bis (dimethylbenzyl)diphenylamine and phenyl-a-naphthylamine; diaryl-p-phenylenediamine-type aging inhibitors such as diphenyl-p-phenylenediamine and dinaphthyl-p-phenylenediamine; and alkylaryl-p-phenylenediamine-type aging inhibitors such as N-isopropyl-N'-phenyl-p-phenylenediamine, N-1,3-dimethylbutyl-N'-phenyl-p-phenylenediamine, N-(3-methacryloyloxy-2-hydroxypropyl)-N'-phenyl-p-phemylenediamine and N-(methacryloyl)-N'-phenyl-p-phenylenediamine.

The amine-ketone-type aging inhibitor is a condensation product of an aromatic amine with a ketone. As specific examples of the amine-ketone-type aging inhibitor, there can be mentioned an aniline-acetone condensation product, a p-phenedine-acetone condensation product and a diphenylamine-acetone condensation product.

As specific examples of the mercaptobenzoimidazole-type aging inhibitor, there can be mentioned mercaptobenzoimidazole and its zinc salt, and mercaptomethylbenzoimidazole and its zinc salt.

As specific examples of the bisphenol-type aging inhibitor, there can be mentioned bisphenol alkanes such as 2,2'-methylene-bis(4-methyl-6-t-butylphenol) and 4,4'-butylidene-bis(3-methyl-6-t-butylphenol), and bisphenol sulfides such as 4,40-thiobis(3-methyl-6-t-butylphenol).

As specific examples of monophenol-type aging inhibitor, there can be mentioned styrenated phenol, 2,6-di-t-butyl-4-methylphenol, 2,6-di-t-butyl-4-ethylphenol, n-octadecyl-3-(3,5-di-t-butyl-4-hydroxyphenyl) propionate, 2,4-dimethyl-6-(1-methylcyclohexyl)phenol, 2-t-butyl-6-(3-t-butyl-2-hydroxy-5-methylbenzyl)-4-methylphenyl acrylate and 2-[1-(2-hydro-3,5-di-t-pentylphenyl)ethyl]-4,6-di-t-pentylphenyl acrylate.

As specific examples of the thiobisphenol-type aging inhibitor, there can be mentioned 4,4'-thiobis(3-methyl-6-t-butylphenol), 4,4'-bis(3,5-di-t-butyl-4-hydroxybenzyl)-sulfide and 4,4'-thiobis(6-t-butyl-o-cresol).

As specific examples of the hydroquinone-type aging inhibitor, there can be mentioned 2,5-di-t-butylhydroquinone and 2,5-di-t-amylhydroquinone.

As specific examples of the nickel salt-type aging inhibitor, there can be mentioned nickel dimethyldithiocarbamate, nickel diethyldithiocarbamate and nickel dibutyldithioabamate and nickel isopropylxanthogenate.

As specific examples of the thiourea-type aging inhibitor, there can be mentioned 1,3-bis(dimethylaminopropyl) thiourea and tributylthiourea.

As specific examples of the thioether-type aging inhibitor, there can be mentioned dilauryl 3,3-thiodipropionate, distearyl 3,3-thiodipropionate and pentaerythritol tetrakis(3-laurylthiopropionate).

As specific examples of the phosphorus-type aging inhibitor, there can be mentioned tris(nonylated phenyl) phosphate.

The amount of the aging inhibitor is usually in the range of from 1 to 10 parts by weight, preferably from 2 to 5 parts by weight, based on 100 parts by weight of the high-Mooney-viscosity highly saturated nitrile group-containing copolymer rubber.

The aging inhibitor may be used either alone or in combination of at least two thereof. The aging inhibitor can be added either at a time or in lots to the highly saturated nitrile group-containing copolymer rubber to which a high shearing force is applied. If two or more aging inhibitors are used, for example, first, an amine-ketone-type aging inhibitor is added, the copolymer rubber is extruded through an extruder, and then, a mercaptobenzoimidazole-type aging inhibitor is added.

Application of High Shearing Force

By the application of a high shearing force according to the invention, the Mooney viscosity $ML_4$ of the high-Mooney-viscosity highly saturated nitrile group-containing copolymer rubber is reduced by at least 15 points, preferably at least 30 points from a value in the range of from 60 to 150 to a value of from 5 to 135, preferably from 20 to 90. The application of a high shearing force is carried out at a shearing rate of from 500 to 5,000 $S^{-1}$, preferably from 800 to 5000$S^{-1}$ and at a temperature of from 180 to 380° C., preferably from 250 to 350° C. substantially in the absence of an oxygen donor such as oxygen, a peroxide or a nitrate salt. To conduct the application of a high shearing force with a high productivity, the shearing rate is preferably in the range of from 2,000 to 5000S$^{-1}$. By the term "substantially in the absence of an oxygen donor" used herein, we mean that an oxygen donor does not coexist with the copolymer rubber as described in Japanese Unexamined Patent Publication No. H3-122103, and the application of a high shearing force is not always limited to the manner wherein it is conducted in an atmosphere of inert gas such as nitrogen.

The highly saturated nitrile group-containing copolymer rubber having a Mooney viscosity, which has been lowered to a predetermined value within the above-mentioned range by the application of a high shearing force, exhibits an increase in Mooney viscosity of up to 10 points, preferably up to 5 points, when the copolymer rubber is allowed to stand in the air at room temperature for 30 days after the application of a high shearing force. The copolymer rubber usually has a ratio of weight average molecular weight (Wn) to number average molecular weight (Mn) of from 3 to 5, preferably from 3.5 to 4.5, and is substantially free from a gel. The average molecular weight used herein means a value as measured by GPC (gel permeation chromatography) and expressed in terms of the molecular weight of standard polystyrene. The amount of gel is a value as measured by using a woven metal wire with 80 mesh after immersion in methyl ethyl ketone for 48 hours.

The apparatus used for applying a high shearing force includes a single screw extruder and extruders provided with two or more screws. A twin screw extruder is preferable. A twin screw extruder of the type wherein the screw flights are capable of engaging with each other and the screws rotate in the same direction is especially preferable. The screw extruder more preferably has screws with a multiple-start thread in view of the magnitude of shearing force applied. Most preferably the screw extruder has screws with a double-start thread or triple-start thread.

More specifically the extruder preferably has an L/D (length/diameter) ratio of at least 30, more preferably from 30 to 50. If the L/D ratio is smaller than 30, the cooling zone of the extruder is too small and the rubber extruded is not cooled to the desired extent immediately after it is extruded from the extruder, and thus, the extruded rubber is difficult to take off. Further, in this case, the rubber is extruded at a high temperature and thus the rubber is readily subject to deterioration or gelation. In other words, the rubber has a high viscosity and thus the heat build-up is very large, and the rubber easily reaches a high temperature. Therefore it is necessary to cool the rubber to a desired extent before the rubber is extruded from the extruder, namely, to enlarge the cooling zone. The temperature of the rubber at the outlet of extruder is preferably not higher than 360° C., more preferably not higher than 330° C.

In general an extruder having a plurality of barrels arranged in series is used wherein the rubber is melted and an aging inhibitor is uniformly dispersed in the molten rubber in the first 1/3 region of the barrels whereby an essentially uniform molten blend is formed. The screws in this region have a constitution such that the rubber is gradually compressed while it is conveyed through this region. The temperatures in this region are preferably set so that the melting and kneading is suitably effected. In practice the temperature is preferably set so that it is gradually elevated in several steps to 250° C.

In the second 1/3 region of the barrels, the screws have a constitution such that the kneading is effected while a high shearing stress is imparted to the rubber at a predetermined high temperature by utilizing the shearing force of the screws. The temperatures in this region are preferably set at a value in the range of from 240 to 320° C., more preferably from 260 to 300° C. The higher the temperature set, the more reduced the Mooney viscosity. But, if the temperature set is too high, the rubber temperature is increased to a great extent and the kneaded rubber is extruded from the extruder before it is cooled to the desired temperature, with the result of deterioration or gelation of rubber as described above. In contrast, if the temperature set is lower than 240° C., the reduction of the Mooney viscosity is undesirably minor. It would be possible that the rubber temperature is increased by the heat build-up due to the application of a high shearing force, but the temperature should preferably be set at a value in the above-mentioned range in view of the stable productivity when using an extruder.

In the last 1/3 region of the barrels, the rubber maintained at a high temperature is cooled, and water and volatile by-products are removed at a reduced pressure through an evacuating vent. Finally the rubber having a reduced Mooney viscosity is extruded through an extrusion region provided with an extrusion head. In the last 1/3 region, the screws preferably have a constitution such that the rubber is conveyed through this region while a minor shearing force is applied thereto. Namely the rubber must be cooled sufficiently while passing through this region. The residence time of the rubber in this region can be controlled by varying screw pitches. The temperature set in this region is in the range of from 180 to 250° C. The evacuation region is maintained at a reduced pressure of from 10 to 750 mmHg, preferably from 700 to 750 mmHg. A normal atmospheric pressure can also be employed.

If desired, when the application of a high shearing force is conducted, a mastication promoter such as, for example, a zinc salt of 2-benzoamidothiophenol can be added to the rubber.

The degree of reduction of Mooney viscosity can be controlled mainly by varying the shearing rate. Usually the shearing rate required for the reduction of Mooney viscosity is chosen within the range of from 500 to 5,000 S$^{-1}$. The degree of reduction of Mooney viscosity varies also depending upon the factors such as temperature and time as well as the shearing rate. Thus a suitable shearing rate should be chosen so as to obtain the desired low Mooney viscosity in consideration of these factors, and can be determined easily by experiments.

Various components can be incorporated in the highly saturated nitrile group-containing copolymer rubber of the invention, which has a reduced Mooney viscosity, according to the use thereof. In general a vulcanizing agent, other rubbers and resins can be incorporated. Other additives conventionally used in the rubber industry, can be incorporated, which include, for example, reinforcers such as carbon black, silica and talc; fillers such as calcium carbonate and clay; processing aids; process oils; other antioxidants; anti-ozonants; silane coupling agents; and colorants. Especially when a sulfur-type vulcanizing agent or an organic peroxide vulcanizing agent is incorporated, a good vulcanizable rubber composition can be obtained.

The sulfur-type vulcanizing agent used includes sulfur such as powdered sulfur, flower of sulfur, precipitated sulfur, colloidal sulfur, surface-treated sulfur and insoluble sulfur; sulfur compounds such as sulfur chloride, sulfur dichloride, morphorine disulfide, an alkylphenol disulfide, N,N'-dithiobis(hexahydro-2H-azepinon-2), sulfur-containing polysulfide and high-molecular weight polysulfide. Further, sulfur-containing vulcanization promoters such as tetramethylthiuram disulfide, selenium dimethyldithiocarbamate and 2-(4'-morphorinodithio)benzothiazole are included.

In combination with these sulfur-type vulcanizing agents, a vulcanization promoter can be used, which includes, for example, zinc white or stearic acid, and other vulcanization promoters such as guanidine-type, aldehyde-amine type, aldehyde-ammonia-type, thiazole-type, sulfenamide-type, thiourea-type and xanthate-type vulcanization promoters.

The amount of the sulfur-type vulcanizing agent is not particularly limited, but is usually in the range of 0.10 to 10 parts by weight, preferably 0.1 to 5 parts by weight, based on 100 parts by weight of the highly saturated nitrile group-containing copolymer rubber.

As specific examples of the organic peroxide vulcanizing agent, there can be mentioned t-butyl hydroperoxide, cumene hydroperoxide, di-t-butyl peroxide, t-butylcumyl peroxide, 2,5-dimethyl-t-butyl peroxyhexane, 2,5-dimethyl-t-butyl peroxyhexyne, 1,3-bis(t-butyl peroxyisopropyl) benzene, p-chlorobenzoyl peroxide, t-butyl peroxybenzoate, t-butyl peroxyisopropylcarbonate and t-butyl benzoate. The amount of the organic peroxide vulcanizing agent is usually in the range of 0.01 to 30 parts by weight, preferably 0.1 to 10 parts by weight, based on 100 parts by weight of the rubber.

As other vulcanizing agents which can also be used in combination with the above-mentioned vulcanizing agents, there can be mentioned polyfunctional compounds such as trimethylolpropane trimethacrylate, divinylbenzene, ethylene dimethacrylate, triallyl isocyanurate. Further, there can be mentioned metallic soap/sulfur-type, triazine/-dithiocarbamate-type, polycarboxylic acid/onium salt-type, polyamine-type (such as hexamethylenediamine, triethylene-tetramine, hexamethylenediamine carbamate, ethylenediamine carbamate and triethylenediamine), and ammonium benzoate-type vulcanizing agents.

The highly saturated nitrile group-containing copolymer rubber with a lowered Mooney viscosity, to which a high shearing force has been applied to reduce the Mooney viscosity according to the invention, exhibits a good processability, and further exhibits an increase in Mooney viscosity of 10 points or fewer while the rubber is allowed to stand in the air at room temperature for 30 days after the Mooney viscosity-reduction. Namely, there is no substantial great increase in Mooney viscosity, and thus, its storage stability is excellent.

Heat-Resistant Rubber Composition

The highly saturated nitrile group-containing copolymer rubber with a lowered Mooney viscosity of the invention can be used as a vulcanizable rubber composition comprising the copolymer rubber as the sole rubber ingredient and additives such as a vulcanizing agent, a filler and others, but it can also be used as a heat-resistant rubber composition having an enhanced processability which comprises the copolymer rubber and another heat-resistant rubber, and additives. The amount of the low-Mooney-viscosity highly saturated nitrile group-containing copolymer rubber of the invention, which has been subjected to the high-shearing-force-application treatment, in the heat-resistant rubber composition is not particularly limited, but is usually at least 5% by weight, preferably at least 30% by weight and more preferably at least 50% .by weight and not more than 95% by weight, based on the total weight of the rubber composition.

The heat-resistant rubber used herein is a rubber which is known usually as a rubber having a heat resistance in the rubber industry, and is classified as a special rubber whereas natural rubber and the like are classified as a general-purpose rubber. As specific examples of the heat-resistant rubber, there can be mentioned nitrile group-containing unsaturated copolymer rubbers and hydrogenation products thereof, ethylenically saturated copolymer rubbers, polyacrylate ester rubbers, polyether rubbers and fluororubbers. At least two different kinds of heat-resistant rubbers can be used in combination. The Mooney viscosity $ML_{1+4}(100°\ C.)$ of the heat-resistant rubber varies depending upon the particular kind of rubber used, but is usually in the range of from 10 to 180, preferably from 40 to 90.

The nitrile group-containing unsaturated copolymer rubber and hydrogenation products thereof, used as the heat-resistant rubber, include, for example, those which are used for the production of the nitrile group-containing unsaturated copolymer rubber with a lowered Mooney viscosity used in the present invention.

The ethylenically saturated copolymer rubber is a copolymer rubber of substantially saturated type, prepared from ethylene, á-olefin and non-conjugated diene. As typical examples of the ethylenically saturated copolymer rubber, there can be mentioned lowly crystalline or non-crystalline elastomers or their mixtures, which have a crystallinity of not larger than 20%, preferably not larger than 10% and are predominantly comprised of ethylene units and á-olefin units each having 3 to 14 carbon atoms, such as an ethylene-propylene-non-conjugated diene terpolymer or multi-polymer rubber, an ethylene-propylene-1-butene-non-conjugated diene multi-polymer rubber and an ethylene-1-butene-non-conjugated diene multi-polymer rubber. Of these, an ethylene-propylene-non-conjugated diene terpolymer rubber is preferable. As specific examples of the non-conjugated diene, there can be mentioned dicyclopentadiene, 1,4-hexadiene, cyclooctadiene, methylenenorbornene and 5-ethylidene-2-norbornene. Especially multi-polymer rubbers having dicyclopentadiene or 5-ethylidene-3-norbornene units as non-conjugated diene units are preferable. These ethylene-á-olefin-type copolyer rubbers preferably have an iodine value of not larger than 20. These ethylene-á-olefin-type copolymer rubbers have a composition such that the ethylene units/á-olefin units ratio is in the range of from 50/50 to 90/10 by mole, preferably from 60/40 to 84/16 by mole, and the (ethylene+á-olefin) units/non-conjugated diene units ratio (in the case of ter- or multi-polymer rubbers) is usually in the range of from 98/2 to 90/10 by mole, preferably from 97/3 to 94/6 by mole.

The polyacrylate ester rubbers are copolymer rubbers comprising at least 80% by mole of alkyl acrylate units having an alkyl group with not more than 8 carbon atoms, such as methyl acrylate, ethyl acrylate or propyl acrylate units, and/or alkoxyalkyl acrylate units having an alkoxyalkyl group with not more than 8 carbon atoms, such as methoxymethyl acrylate.

As examples of the monomers to be copolymerized with the alkyl acrylate and/or the alkoxyalkyl acrylate, there can be mentioned aromatic vinyl-type monomers such as styrene, á-methylstyrene and vinyl pyridine; fluoroalkyl vinyl ethers such as fluoroethyl vinyl ether, fluoropropyl vinyl ether, trifluoromethyl vinyl ether, trifluoroethyl vinyl ether, perfluoropropyl vinyl ether and perfluorohexyl vinyl ether; fluorine-containing vinyl monomers such as o- or p-trifluoromethylstyrene, vinyl pentafluorobenzoate, difluoroethylene and tetrafluoroethylene; unsaturated monocarboxylic acids such as acrylic acid and methacrylic acid; unsaturated dicarboxylic acids such as itaconc acid, fumaric acid and maleic acid, and anhydrides thereof; polyethylene glycol acrylate, polyethylene glycol methacrylate, polypropylene glycol acrylate, polypropylene glycol methacrylate, epoxy acrylate, epoxy methacrylate, urethane acrylate and urethane methacrylate.

Crosslinking monomers, which are usually used for polyacrylate ester rubbers, can be copolymerized. As specific examples of the crosslinking monomer, there can be mentioned active chlorine-containing unsaturated monomers such as 2-chloroethylvinyl ether, vinyl chloroacetate, allyl chloroacetate, vinylbenzyl chloride, 2-chloroethyl vinyl ether, chloromethyl vinyl ketone and 5-chloromethyl-2-norbornene; inactive chlorine-containing unsaturated monomers such as 2-chloroethyl vinyl ether; and epoxy group-containing unsaturated monomers such as glycidyl acrylate, glycidyl methacrylate, allyl glycidyl ether and vinyl glycidyl ether. Carboxyl group-containing unsaturated monomers can also be used. Of these, active chlorine-containing unsaturated monomers are preferable.

Among the above-mentioned polyacrylate ester rubbers, copolymers made from at least 90% by mole, preferably at least 95% by mole, of ethyl acrylate and not more than 10% by mole, preferably not more than 5% by mole, of a copolymerizable monomer, and substantially not containing carbon-to-carbon unsaturation. By using this ethyl acrylate copolymer, a rubber composition having a high heat resistance, which is not deteriorated or deteriorated only to a negligible extent by curing even when it is stored for a long period, is obtained. The monomer to be copolymerized with ethyl acrylate is a monomer substantially not having carbon-to-carbon unsaturation (except for unsaturations in a benzene ring) other than the carbon-to-carbon unsaturation which is concerned with the copolymerization with ethyl acrylate.

In general, unsaturated compounds having a carbon-to-carbon unsaturation in addition to the carbon-to-carbon unsaturation concerned with the copolymerization with ethyl acrylate, which include, for example, butadiene, 2-butenyl acrylate, tetrahydrobenzyl acrylate, allyl acrylate, triallyl isocyanurate and divinylbenzene, are used as a crosslinking ingredient in acrylic rubbers, but, the unsaturated compounds having such carbon-to-carbon unsaturation are not preferable because these unsaturated compounds accelerate curing deterioration and result in a rubber not suitable for the use in which a high heat resistance is required.

The polyether rubber used as a heat-resistant rubber in the present invention is a polymer or copolymer of at least one monomer selected from the group consisting of epichlorohydrin and alkyloxysilanes having 2 to 10 carbon atoms; or a copolymer of at least one monomer selected from this group with up to 10% by mole, based on the total mole number of the copolymer, of a copolymerizable unsaturation-containing epoxy compound.

As specific examples of the alkyloxysilane having 2 to 10 carbon atoms, there ca be mentioned oxysilane, methyloxysilane, ethyloxysilane, propyloxysilane, butyloxysilane, hexyloxysilane and octyloxysilane. Of these, silane (i.e. ethylene oxide) and methyloxysilane (i.e., propylene oxide) are preferable. Methyloxysilane is most preferable.

As specific examples of the unsaturation-containing epoxy compound to be copolymerized with these monomers, there can be mentioned allyl glycidyl ether, vinylglycidyl ether, glycidyl methacrylate, glycidyl acrylate and glycidyl itaconate. Of these, allyl glycidyl ether is preferable.

As specific examples of the polyether rubber, there can be mentioned polyepichlorohydrin rubber, epichlorohydrin-ethylene oxide copolymer rubber, epichlorohydrin-ethylene oxide-allyl glycidyl ether copolymer rubber, epichlorohydrin-ethylene oxide-propylene oxide copolymer rubber and epichlorohydrin-ethylene oxide-propylene oxide-allyl glycidyl ether copolymer rubber.

The fluororubber used as a heat-resistant rubber in the present invention is a copolymer derived from a combination of monomers selected from the following monomers. As examples of the fluorine-containing monomers, there can be mentioned vinylidene fluoride, hexafluoropropene, pentafluoropropene, trifluoroethylene, trifluorochloroethylene, tetrafluoroethylene, vinyl fluoride, perfluoro(methyl vinyl ether) and perfluoro (propylvinylidene). In addition, copolymerizable monomers can be used which include, for example, vinyl compounds such as acrylate esters, olefin compounds such as propylene, diene compounds, and halogen-containing vinyl compounds such as those containing chlorine, bromine or iodine.

As specific examples of the fluororubber, there can be mentioned a vinylidene fluoride-trifluorochloroethylene copolymer, a vinylidene fluoride-hexafluoropropylene copolymer, a vinylidene fluoride-hexafluoropropylene-tetrafluoroethylene terpolymer, a terafluoroethylene-propylene copolymer and a tetrafluoroethylene-vinylidene fluoride-propylene terpolymer.

As examples of the available fluororubbers, there can be mentioned fluororubbers capable of being crosslinked with a combination of an organic peroxide with a crosslinking promoter, but incapable of being crosslinked with a polyol crosslinking agent or an amine crosslinking agent, such as, for example, JSR Afrus 150 (supplied by JSR Corp.), and fluororubbers almost incapable of being crosslinked with an organic peroxide, but capable of being crosslinked with a polyol crosslinking agent or an amine crosslinking agent, such as, for example, Viton A, Viton B and Viton E60C (supplied by Du Pont Co.), and Technoflon (supplied by Monte-Edison Co.).

Further, as a heat-resistant rubber, a high-tenacity elastomer composition comprising a highly saturated nitrile group-containing copolymer rubber having incorporated therein a metal salt of an ethylenically unsaturated carboxylic acid, for example, as described in Japanese Unexamined Patent Publication No. H1-306443, may be used, whereby a heat-resistant rubber having a more enhanced tenacity can be obtained.

As the metal salt of an ethylenically unsaturated carboxylic acid, those which are composed of an ethylenically unsaturated carboxylic acid having not more than 5 carbon atoms and 1 or 2 carboxyl groups, and a metal tonically bonded to the carboxylic acid, can be used. As specific examples of the ethylenically unsaturated carboxylic acid, there can be mentioned monocarboxylic acids such as acrylic acid and methacrylic acid; dicarboxylic acids such as maleic acid, fumaric acid and itaconic acid; and monoesters of an unsaturated carboxylic acid such as monomethyl maleate and monoethyl itaconate. The metal used is not particularly limited provided that it is capable of forming a salt with the above-mentioned ethylenically unsaturated carboxylic acid, and usually includes zinc, magnesium, calcium, barium, titanium, chromium, iron, cobalt, nickel, aluminum, silver and lead. In view of the mechanical strength of rubber, zinc, magnesium, calcium and aluminum are preferable. Zinc is most preferable. The ratio of the ethylenically unsaturated carboxylic acid to the metal is preferably in the range of from 1/0.5 to 1/3 by mole.

In the case where the metal salt of an ethylenically unsaturated carboxylic acid is mixed and kneaded with the copolymer rubber to prepare an elastomer composition, it may be incorporated in the form of the metal salt in the copolymer rubber, or the above-mentioned ethylenically unsaturated carboxylic acid and a metal in the form of an oxide, a hydroxide or a carbonate salt may be incorporated, as they are, in the copolymer rubber and be reacted with each other during kneading of the mixture.

The amount of the metal salt of an ethylenically unsaturated carboxylic acid is not particularly limited, but is usually in the range of from 3 to 120 parts by weight, preferably 5 to 100 parts by weight and more preferably 190 to 60 parts by weight, based on 100 parts by weight of the rubber. If the amount of the metal slat is too large or too small, the rubber has a poor mechanical strength.

As mentioned above, according to the need, additives conventionally used in the rubber industry, can be incorporated in the heat-resistant rubber composition. The additives include, for example, reinforing agents such as carbon black, silica and talc; fillers such as calcium carbonate and clay; processing aids, process oils, antioxidants, anti-ozonants, vulcanization promoters and colorants.

The procedure for preparing the heat-resistant rubber composition is not particularly limited, but, usually the highly saturated nitrile group-containing copolymer rubber, the heat-resistant rubber, and vulcanizing agent and other additives are mixed and kneaded together by an extruder or a mixing means such as a roll or Banbury mixer to prepare the rubber composition.

Composite of Rubber with Fiber

The highly saturated nitrile group-containing copolymer rubber prepared by the high-shearing-force applying treatment according to the invention exhibits good processability and good adhesion to nylon and other fibers, and thus, a composite of the copolymer rubber with a fiber results, when the rubber is vulcanized and adhered, in a rubber article having an enhanced adhesion and mechanical strength. This rubber article is useful for a belt and a hose. As examples of the reinforcing fiber used, there can be mentioned natural fibers such as cotton, regenerated fibers such as rayon, synthetic fibers such as nylon, a polyester fiber, vinylon and an aromatic polyamide fiber, a steel fiber, a glass fiber and a carbon fiber. These fibers may be used either alone or as a combination of at least two thereof. These fibers are used in the form of a staple fiber, a filament, a cord, a rope, and woven fabrics such as canvas and a cord fabric. The fibers are embedded as a tensile reinforcer within the highly saturated nitrile group-containing copolymer rubber. The kind of fiber and the shape of the fiber article can be suitably chosen depending upon the particular use or article thereof, e.g., the belt or other articles.

The fibers are subjected to a pre-adhesion treatment by a conventional procedure prior to the making of the composite thereof with the copolymer rubber, but a special procedure is not needed. For example, in the case of rayon or nylon fiber, the pre-adhesion treatment is conducted by using a mixture of an aqueous solution of a resorcinol-formaldehyde precondensate with a rubber latex (the solution of a resorcinol-formaldehyde precondensate is hereinafter abbreviated to "RF", and its mixture with.the rubber latex is hereinafter abbreviated to "RFL"). In the case of a polyester fiber and an aromatic polyamide fiber, these fibers have a poor adhesion to rubber due to their molecular structure, and thus, a good adhesion. cannot be obtained by the pre-adhesion treatment with RFL. Therefore, these fibers are first treated with a solution of an isocyanate compound, an ethylene thiourea compound, an epoxy compound or a combination of at least two thereof, secondly heat-treated, and then, subjected to the RFL treatment. In the case of a glass fiber, the fiber is generally treated with an epoxy-silane compound or an amino-silane compound (e.g., a silane coupling agent such as aminopropyltriethoxysilane) prior to the pre-adhesion treatment with RFL.

The rubber latex used for the RFL treatment is not particularly limited. As specific examples of the rubber latex, there can be mentioned nitrile-type copolymer latexes such as an acrylonitrile-butadiene copolymer latex, an acrylonitrile-butadiene-acrylic acid copolymer latex, an acrylonitrile-butadiene-vinyl pyridine copolymer latex, and latexes of hydrogenation products of these copolymers prepared by hydrogenating the butadiene portion in the copolymers; and latexes of halogen-containing polymers such as an epichlorohydrin polymer, a copolymer of epichlorohydrin with at least one other epoxide or oxetane, chloroprene rubber, chlorosulfonated polyethylene, chlorinated polyethylene, a chlorine-containing acrylic rubber having copolymrized with a chlorine-containing monomer as a crosslinkng monomer, a brominated butyl rubber, polyvinylidene chloride, a chlorinated or brominated diene rubber (such as an acrylonitrile-butadiene copolymer rubber, a styrene-butadiene copolymer rubber or a polybutadiene rubber) and a chlorinated or brominated ethylene-propylene-diene terpolymer rubber. When an aqueous emulsion of the above-mentioned highly saturated nitrile group-containing copolymer rubber is used as a latex used for the RFL treatment, the adhesion between the rubber composition and the fiber can be more enhanced. These latexes may be used either alone or in cmbination.

The procedure for preparation of the rubber latex used is not particularly limited. For example, a polymer latex as prepared by an emulsion polymerization can be used as it is, and a solid polymer as prepared by polymerization can be used as a latex prepared by phase inversion.

The proportion of the rubber latex and RF in the RFL liquid for treating the fiber is not particularly limited, but the ratio of the rubber latex to RF is preferably in the range of from 10/1 to 2/1 by weight (as the weight of solid content). The proportion of resorcinol and formaldehyde in the RF liquid also is not particularly limited, but the ratio of resorcinol to formaldehyde is preferably in the range of from 1/3 to 3/1 by mole, more preferably from 1/1 to 1.5/1 by mole. The RF liquid used is not particularly limited, and those, which are usually employed used for adhesion and vulcanization of a rubber composition to a fiber, can be used.

The procedure by which the fiber is treated with the RF liquid is not particularly limited. Generally a procedure wherein the fiber is immersed in the RF liquid and then heat-treated is usually employed. The conditions under which the heat-treatment is conducted are not particularly limited. Although suitable conditions vary to some extent depending upon the kind of fiber, the temperature and time should be chosen so that the RFL adhered by the immersion treatment is reacted to be thereby cured to a sufficient extent. Usually the heat-treatment is conducted at a temperature of from 140 to 210° C. for several minutes. According to the need, prior to the immersion in the RF liquid, the fiber can be pre-treated by a procedure wherein the fiber is immersed in an isocyanate solution, an epoxy solution or a mixture thereof and then dried. The drying temperature is preferably lower than the succeeding heat -treating temperature.

After the fiber is subjected to the RFL treatment, the fiber is adhered to the rubber composition and then the rubber composition is vulcanized. More specifically, the fiber is incorporated in or laminated with a composition of the highly saturated nitrile group-containing copolymer rubber, and then the rubber composition is vulcanized under ordinary conditions. The vulcanization conditions are not particularly limited, but usually the vulcanization is conducted at a temperature of from 130 to 200° C. under a pressure of from 0.5 to 20 MPa for a period of 1 to 120 minutes. The rubber composition is prepared by mixing the copolymer rubber with additives ordinarily used in the rubber industry, by using a mixing means. The kind and amount of the additives are determined depending upon the use of the rubber/fiber composite, and is not particularly limited in the present invention.

The invention will now be described specifically by the following examples. Parts and % in the examples and comparative examples are by weight unless otherwise specified.

The aging inhibitors used in the examples and comparative examples are as follows.
(1) Poly(2,2,4-trimethyl-1,2-dihydroquinoline) (RD, TMDQ; amine-ketone-type "Nocrac 224").
(2) Alkylated diphenylamine (ODA,; aromatic secondary amine-type "Nauguard 445".
(3) 2,2'-Metylenebis(4-methyl-6-t-butylphenol) (2246, MBMBP; bisphenol-type "Nocrac NS6").
(4) 2-Mercaptobenzimidazole (MB, MBI; mercaptobenzimidazole-type "Nocrac MB")

Characteristics of copolymers and rubber compositions were determined as follows.

(1) High-rate Vulcanizability

Unvulcanized rubber compositions were prepared according to predetermined recipe. Using10 g of each vulcanizable rubber composition, the scorch time ($T_5$ and $T_{95}$ in minute) and the maximum torque ($V_{max}$ in kgf·cm) at a temperature of 170° C. were determined by a curastometer according to the Society of Rubber Industrial Japan Standard SRIS 3102. The smaller the $T_5$ value, the higher the rate of vulcanization. The larger the $V_{max}$ value, the larger the crosslinking efficiency.

(2) Properties of Rubber Vulcanizate

According to Japanese Industrial Standard (JIS) K6301, an vulcanized rubber formulation prepared according to the recipe was vulcanized temperature of 170° C. for 20 minutes to give sheets having a thickness of 2 mm. A #3 dumbell specimens were cut out from the sheets, and the tensile strength (unit: $kgf/cm^2$), the tensile stress at 100%, 200% and 300% elongation (unit: $kgf/cm^2$) and the elongation at break (%) were measured. Permanent set (percentage of strain: %) was measured after the specimen was unloaded and then was maintained at 150° C. for 70 hours. The hardness was measured by using a JIS spring-type A. Further, impact resilience (unit: %) was measured according to JIS K6301.

Oil resistance (volume change in %) was evaluated according to JIS K6301 by the volume change (%) as measured after immersion of the specimen in #3 lubricating oil having a kinetic viscosity of 31.9 to 34.1, an aniline point of 68.5 to 70.5° C. and a flash point of 162.7° C.

(3) Bound Nitrile Content

Bound nitrile content was determined by measuring the content of nitrogen in a copolymer by the Kjeldahl method according to JIS K6384, and calculating the bound nitrile content from the nitrogen content (unit: %).

(4) Mooney Viscosity [$ML_{1+4}$]

Measurement was carried out at 100° C. on about 40 g of a copolymer sample according to JIS K6384.

(5) Molecular Weight and Molecular Weight Distribution

Number average molecular weight (Mn) and weight average molecular weight (Mw) of a copolymer were determined by conducting measurement by gel permeation chromatography using tetrahydrofuran as a solvent and correcting the measured values in terms of those of standard polystyrene.

The ratio of Mw and Mn was calculated.

(6) Processability (Garvey Die Extrusion)

An unvulcanized rubber composition having the predetermined recipe was extruded by using a Garvey die according to ASTM D-2230-77 to determine the die swell (%) and the extrusion rate (g/min). Further, the configuration and state of the rubber extrudate was evaluated on the degree of porosity and degree of swelling, and the edge, surface and corner portions thereof. The evaluation results were expressed by four ratings. Rating 4 and rating 1 means the best and worst configuration and state, respectively.

(7) Processability (Banbury Kneading and Roll Milling Test)

(a) Power consumption in Banbury kneading

A rubber and carbon black was kneaded together by using 1.7 liter Banbury mixer (supplied by Sakai Juko K.K.) at a revolution number 100 rpm and a revolution number ratio of a rotor of 1.12. The mixer was charged with a rubber and mastication was carried out for 1 minute. Then carbon black was added and kneaded for 3 minutes. When carbon black was added, the Banbury mixer was stopped, and carbon black deposited on a hopper wall was brushed into the mixer. Then, the rubber and carbon black were kneaded together again for 1 minute, and taken out the kneaded mixture as a master batch. Power consumption (kW) was expressed as the electric energy consumed in the whole kneading process using the Banbury mixer.

(b) Roll Milling

Roll milling was evaluated by the difficulty of mixing when the master batch taken out from the Banbury mixer and other ingredients were kneaded together, and the evaluation results were expressed by the four ratings A to D. "A" means that the kneading property of the master batch and the ingredient were excellent; "B" means that these two were kneaded in usual kneading without any bagging; "C" means that they were kneaded, but the bagging occurred and it took a long time for kneading; and "D" means that the kneading of them was very difficult because bagging occurred to a serious extent.

(c) Roll distance at bagging

Kneading of the ingredients was conducted at a roll distance varied by steps. Namely, when each step of kneading was terminated, the roll distance was increased by 0.5 mm from 2 mm. The kneading property was expressed by the roll distance at a kneading step at which bagging occurred. The larger the roll distance, the better the roll milling.

(8) Filler gel (% by weight)

The amount of filler gel is measured when a kneaded mixture of the rubber and the ingredients was immersed in methyl ethyl ketone for 48 hours by using a woven metal wire with 80 mesh size.

EXAMPLES 1 to 4. COMPARATIVE EXAMPLES 1 AND 2

100 Parts by weight of a hydrogenated acrylonitrile-butadiene copolymer rubber (hydrogenated NBR, hydrogenation degree 90%, iodine value 28, bound nitrile content 36%, Mooney viscosity $ML_4$ 78) and 3 parts of an aging inhibitor were introduced into a twin screw extruder, where the mixture was kneaded and a high shearing force was applied thereto under the conditions described below (Examples 1 to 4).

Twin screw extruder: BT-40 manufactured by Plastic Engineering Research Laboratories Inc.: screw diameter 38 mm, screw length 1,600 cm, L/D 42, 7 barrels constitution, screw revolution number 400 rpm, treatment rate 7 kg/hr.

Set temp.: barrel 1 (introducing zone) 100° C.
Set temp.: barrel 2 (melting zone) 250° C.
   barrel 3 to 6 (kneading and shearing zone) 250 to 290° C.
   barrel 7 (kneading and deaerating zone) 200 to 250° C., 720 mmHg Shearing rate: 3,200 S$^{-1}$
   residence time in barrels 1 to 7:120 to 180 seconds The shearing-treated rubber was stored in the air at room temperature, the Mooney viscosity of the rubber was measured immediately after the extrusion, after 1 day, 5 days, 8 days, 15 days, 22 days, 29 days and 61 days from the extrusion.

For comparison, Mooney viscosity of the rubber which was obtained by conducting the high-shearing-force application treatment of the hydrogenated NBR the absence of an aging inhibitor was measured (Comparative Example 1). The Mooney viscosity of the rubber which was obtained by conducting the high-shearing-force application treatment in the same manner as that in Comparative Example 1, and then adding an aging inhibitor was measured (Comparative Example 2).

Molecular weight distribution (Mw/Mn) was determined immediately after the extrusion and 29 days after the extrusion. The results are shown in Table 1.

Furthermore, 29 days after the application of high shearing force, a rubber composition was prepared according to the recipe shown below, and the Garvey die extrusion test was carried out. The results were shown in Table 1.

Composition

| Rubber | 100 parts by weight |
|---|---|
| Zinc oxide | 5 parts by weight |
| Stearic acid | 0.5 parts by weight |
| SRF carbon black #60 | 60 parts by weight |
| Aging inhibitor | 1.5 parts by weight |
| Peroxide | 6 parts by weight |

TABLE 1

|  | Comp. Examples | | Examples | | | |
|---|---|---|---|---|---|---|
|  | 1 | 2 | 1 | 2 | 3 | 4 |
| Aging inhibitor | — | Added after treatment with TMDQ | TMDQ | ODA | MBMBP | MBI |
| Mooney viscosity | | | | | | |
| Before treatment | 78 | 78 | 78 | 78 | 78 | 78 |
| Immediately after treatment | 40 | 40 | 25 | 28 | 31 | 26 |
| 1 day after | 46 | 45 | 26 | 30 | 32 | 26 |
| 5 days after | 56 | 48 | 27 | 31 | 32 | 27 |
| 8 days after | 57 | 50 | 26 | 31 | 34 | 29 |
| 15 days after | 59 | 52 | 26 | 31 | 35 | 29 |
| 22 days after | 62 | 56 | 27 | 32 | 36 | 30 |
| 29 days after | 68 | 58 | 27 | 35 | 38 | 30 |
| 61 days after | 70 | 60 | 27 | 35 | 38 | 30 |
| Molecular weight distribution | | | | | | |
| Before treatment | 2.8 | 2.8 | 2.8 | 2.8 | 2.8 | 2.8 |
| Immediately after treatment | 5.1 | 5.1 | 3.5 | 3.5 | 3.9 | 3.4 |
| 29 days after | 7.3 | 6.5 | 3.6 | 3.7 | 4.0 | 3.6 |
| Garvey die extrusion | | | | | | |
| Swell-foam | 4 | 4 | 4 | 4 | 4 | 4 |
| Surface texture | 1 | 1 | 4 | 4 | 4 | 4 |
| Corner | 1 | 1 | 4 | 4 | 4 | 4 |
| Edge | 1 | 1 | 4 | 4 | 4 | 4 |
| Total | 7 | 7 | 16 | 16 | 16 | 16 |

As seen from Table 1, where the application of high shearing force is conducted in the absence of an aging inhibitor, the Mooney viscosity is lowered to a considerable extent, but the increase of Mooney viscosity during storage is undesirable large (Comparative Example 1). Where the application of high shearing force is conducted in the absence of an aging inhibitor and then an aging inhibitor is added, the increase of Mooney viscosity is not large, but the storage stability is not enhanced to a satisfying extent (Comparative Example 2). Where the application of high shearing force is conducted in the presence of an aging inhibitor according to the present invention, the Mooney viscosity is lowered to a larger extent than the case where the application of high shearing force is conducted in the absence of an aging inhibitor, and the increase of Mooney viscosity during storage is very minor (Examples 1 to 4). Especially when an amine-ketone-type or mercaptobenzoimidazole-type aging inhibitor is used as the aging inhibitor, the increase of Mooney viscosity during storage is negligible (Examples 1 and 4).

Further, the Garvey die extrusion test revealed that where the application of high shearing force is conducted in the presence of an aging inhibitor according to the invention, the extrusion characteristics of rubber are drastically improved.

EXAMPLES 5 to 8 AND COMPARATIVE EXAMPLE 3

Nitrile group-containing copolymer rubber (hydrogenated NBR, hydrogenation degree 90%, iodine value 28, bound nitrile content 36%, Mooney viscosity 78 for Examples 5 to 7 and Comparative Example 3 or Mooney viscosity 140 for Example 8) was pelletized by a pelletizer (supplied by Moriyama seisakusho K.K., MS type feeder ruder, type FR-35). 100 Parts by weight of the rubber pellet and 3 parts by weight of an aging inhibitor (amine-ketone type, Nocrac 224, Ouchi Shinko K.K.) and 1 part of another aging inhibitor (benzoimidazole type, Nocrac MB: Ouchi Shinko K. K.) were introduced into a twin screw extruder, where the mixture was kneaded and high shearing force was applied thereto under the conditions described below. The results are shown in Table 2.

Twin screw extruder: BT-40 manufactured by Plastic Engineering Research Laboratories Inc.: screw diameter 38 mm, screw length 1,600 cm, L/D 42, 7 barrels constitution, screw revolution number 400 rpm, treatment rate 10 kg/hr.

| No. of screw revolution (rpm) | 100 | 300 | 500 |
|---|---|---|---|
| Shear rate (S$^{-1}$) | 800 | 2,400 | 4,000 |
| Resistance time (sec) | 120–180 | 100–160 | 90–150 |

| | | |
|---|---|---|
| Set temp.: | barrel 1 (introducing zone) | 30° C. |
| Set temp.: | barrel 2 (melting zone) | 150° C. |
| | barrel 3 | 250° C. |
| | barrel 4 (kneading zone) | 280° C. |
| | barrel 5 | 260° C. |
| | barrel 6 (cooling zone) | 200° C. |
| | barrel 7 | 200° C. |
| | die head | 200° C. |

TABLE 2

| | Comp. Examples | Examples | | | |
|---|---|---|---|---|---|
| | 3 | 5 | 6 | 7 | 8 |
| Aging inhibitor | | | | | |
| Amine-ketone type | none | 3 | 3 | 3 | 3 |
| Benzoimidazole type | none | 1 | 1 | 1 | 1 |
| No. of screw revolution (rpm) | 300 | 100 | 300 | 500 | 300 |
| Rubber temperature at outlet (° C.) | 278 | 267 | 276 | 283 | 266 |
| Mooney viscosity | | | | | |
| Before treatment | 57 | 57 | 57 | 57 | 140 |
| Immediately after treatment | 39 | 40 | 27 | 17 | 48 |
| 1 day after | 44 | 40 | 28 | 16 | 48 |
| 7 days after | 50 | 41 | 27 | 17 | 48 |
| 14 days after | 53 | 41 | 27 | 16 | 48 |
| 32 days after | 56 | 41 | 27 | 16 | 48 |
| 65 days after | 60 | 41 | 27 | 16 | 48 |
| 93 days after | 65 | 41 | 27 | 16 | 47 |
| Gel | | | | | |
| 7 days after | 0.5 | 0.2 | 0.5 | 0.3 | 0.5 |
| 65 days after | 0.8 | 0.6 | 0.8 | 0.1 | 0.3 |

As shown in Table 2, where the application of high shearing force is conducted at a temperature of 250 to 300° C., the increase of Mooney viscosity is not larger than 5 points as measured 30days after the Mooney viscosity-lowering treatment. Thus, the resulting rubber is substantially free from gel.

EXAMPLES 9 AND 10, AND COMPARATIVE Examples 4 AND 5

Mooney viscosity of a hydrogenated rubber of which Mooney viscosity 142 (Zetpol 2020H, bound acrylonitrile content 36%, iodine value 28, supplied by Nippon Zeon Co.) was decreased by using a twin screw extruder according to the process of the present invention under the conditions described below. Processability and properties of the rubber vulcanized with the sulfur type vulcanizer were evaluated. The results are shown in Table 3.

Pelletizer: the same as that used in Example 5

Aging inhibitor: kind and amount were the same as in Example 5

| No. of screw revolution (rpm) | 200 | 300 |
|---|---|---|
| Shear rate (S$^{-1}$) | 16,000 | 2,400 |
| Resistance time (sec) | 110–170 | 100–160 |

In Comparative Example 4, the hydrogenated NBR prepared in Comparative Example 1 was used. In Comparative Example 5, the hydrogenated NBR (Zetpol 2020L, bound nitrile content 36%, iodine value 28, supplied by Nippon Zeon Co.) was used. The results are shown in Table 3.

TABLE 3

| | Comp. Examples | | Examples | |
|---|---|---|---|---|
| | 4 | 5 | 9 | 10 |
| Composition | | | | |
| Rubber | 100 | 100 | 100 | 100 |
| ZnO#1 | 5 | 5 | 5 | 5 |
| Stearic acid | 1 | 1 | 1 | 1 |
| Carbon black | 50 | 50 | 50 | 50 |
| Plasticizer (TOTM) | 5 | 5 | 5 | 5 |
| Nocrac 445 | 1.5 | 1.5 | 1.5 | 1.5 |
| Nocrac MBZ | 1.5 | 1.5 | 1.5 | 1.5 |
| Sulfer | 0.5 | 0.5 | 0.5 | 0.5 |
| Nocceler TT | 1.5 | 1.5 | 1.5 | 1.5 |
| Nocceler M | 0.5 | 0.5 | 0.5 | 0.5 |
| Mooney viscosity (100° C., $ML_{1+4}$) | | | | |
| Before Mooney reduction treatment | 78 | * | 142 | 142 |
| Mooney viscosity after 30 days standing | 68 | 56 | 69 | 57 |
| Processability | | | | |
| Power consumption at Banbury kneading (kw) | 8.3 | 7.6 | 7.5 | 6.8 |
| Roll milling | D | C | B | A |
| Garvey die extrusion | | | | |
| g/min (average of n = 4) | 31.7 | 36.8 | 35.8 | 40.3 |
| cm/mm (average of n = 4) | 63.6 | 64.8 | 65.4 | 68.5 |
| Swell (%) | 80.0 | 92.1 | 99.7 | 102.8 |
| Edge | 1.5 | 2.5 | 4.0 | 4.0 |
| Corner | 2.0 | 2.5 | 4.0 | 4.0 |
| Surface texture | 1.5 | 2.5 | 3.5 | 4.0 |
| Shape | 4.0 | 4.0 | 4.0 | 4.0 |
| Total | 9.0 | 11.5 | 15.5 | 16.0 |
| Filler gel (wt. %) | 0.4 | 0.2 | 6.7 | 7.5 |
| Tensile properties | | | | |
| Tensile stress (kgf/cm$^2$) | 205 | 229 | 252 | 253 |
| Elongation (%) | 420 | 540 | 510 | 530 |
| 100% tensile stress (kgf/cm$^2$) | 25 | 27 | 30 | 27 |
| 200% tensile stress (kgf/cm$^2$) | 60 | 63 | 74 | 67 |
| 300% tensile stress (kgf/cm$^2$) | 100 | 102 | 122 | 112 |
| Permanent set (150° C. × 70 br) | | | | |
| Strain (%) | 77.0 | 76.7 | 71.3 | 73.7 |

EXAMPLES 11 to 13 AND COMPARATIVE EXAMPLES 6 AND 7

Mooney viscosity of the hydrogenated rubber of which Mooney viscosity 113 (Zetpol 2020H, bound acrylonitrile content 36%, iodine value 11, supplied by Nippon Zeon Co.) was decreased by using a twin screw extruder according to the process of the present invention under the conditions described below. Processability and properties of the rubber vulcanized with the organic peroxide type vulcanizer were evaluated. The results are shown in Table 4.

Pelletizer: the same as that used in Example 5

Aging inhibitor: kind and amount used were the same as in Example 5

| Example No. | 11 | 12 | 13 |
|---|---|---|---|
| No. of screw revolution (rpm) | 200 | 300 | 400 |
| Shear rate ($S^{-1}$) | 1,600 | 2,400 | 3,200 |
| Resistance time (sec) | 110–170 | 100–160 | 90–150 |

In Comparative Example 6, the hydrogenated NBR prepared in Comparative Example 1 was used. In Comparative Example 7, the hydrogenated NBR having Mooney viscosity 65 (Zetpol 2020L, bound nitrile content 36%, indine value 11, supplied by Nippon Zeon Co.) was used. The results were expressed in Table 4.

TABLE 4

| | Comp. Examples | | Examples | | |
|---|---|---|---|---|---|
| | 6 | 7 | 11 | 12 | 13 |
| Composition | | | | | |
| Rubber | 100 | 100 | 100 | 100 | 100 |
| Carbon black SRF | 50 | 50 | 50 | 50 | 50 |
| Peroximon F-40 | 5 | 5 | 5 | 5 | 5 |
| Mooney viscosity (100° C., $ML_{1+4}$) | | | | | |
| Before Mooney reduction treatment | 78 | * | 113 | 113 | 113 |
| Mooney viscosity after 30 days standing | 68 | 65 | 71 | 57 | 26 |
| Processability | | | | | |
| Power consumption at Banbury kneading (kw) | 8.2 | 7.4 | 6.7 | 6.2 | 5.3 |
| Roll distance at bagging (mm) | 3.5 | 4.0 | 4.5 | 5.5 | No bagging |
| Roll milling | D | D | B | B | A |
| Garvey die extrusion | | | | | |
| g/min (average of n = 4) | 45.3 | 50.8 | 58.2 | 56.8 | 58.3 |
| cm/min (average of n = 4) | 112.8 | 118.4 | 128.5 | 135.4 | 126.4 |
| Swell (%) | 50.2 | 49.5 | 55.8 | 59.2 | 50.8 |
| Edge | 1.5 | 2.5 | 3.0 | 3.0 | 4.0 |
| Corner | 2.0 | 2.0 | 3.0 | 4.0 | 4.0 |
| Surface texture | 2.0 | 2.0 | 4.0 | 4.0 | 4.0 |
| Shape | 4.0 | 4.0 | 4.0 | 4.0 | 4.0 |
| Total | 9.5 | 10.5 | 14.0 | 15.0 | 16.0 |
| Filler gel (wt. %) | 0.5 | 0.3 | 18.4 | 16.8 | 19.2 |
| Tensile properties | | | | | |
| Tensile stress ($kgf/cm^2$) | 205 | 215 | 242 | 238 | 214 |
| Elongation (%) | 400 | 490 | 440 | 410 | 440 |
| 100% tensile stress ($kgf/cm^2$) | 31 | 33 | 42 | 42 | 38 |
| 200% tensile stress ($kgf/cm^2$) | 85 | 91 | 119 | 116 | 98 |
| 300% tensile stress ($kgf/cm^2$) | 140 | 151 | 189 | 190 | 167 |
| Permanent set (150° C. × 70 hr) | | | | | |
| Strain (%) | 33.5 | 32.3 | 26.3 | 28.4 | 29.0 |

As seen from Table 3 and Table 4, by applying a high shearing force to a highly saturated nitrile group-containing copolymer rubber according to the present invention, a rubber composition having an enhanced processability is obtained. The rubber composition exhibits a reduced power consumption when kneaded by Banbury mixer, and the kneading time can be shortened. The Garvey die extrusion test revealed that it has an enhanced processability, and the rubber composition is suitable for tubes and hoses. The copolymer rubber with a lowered Mooney viscosity treated by using a twin screw extruder according to the present invention exhibits an enhanced processability, as compared with the rubber having a Mooney viscosity similar to that of the rubber of the invention and as compared with the hydrogenated NBR exhibiting an increase in Mooney viscosity of at least 10 points after 30 days from the viscosity-lowering treatment.

When the Mooney-lowering treatment is carried out by using a twin-screw extruder, the resulting rubber contains a salient amount of filler gel, which shows that good dispersion of filler such as carbon can be attained and a vulcanizate having good properties can be obtained. Abrasion resistance and oil resistance would also be improved.

Usually when the Mooney viscosity is lowered, the mechanical strength and other properties are rather deteriorated. But, the copolymer rubber of the invention exhibits an enhanced processability as well as improved physical properties.

EXAMPLES 14 to 18 AND COMPARATIVE EXAMPLES 8 to 12

100 Parts of the rubber prepared in Examples 11 to 13, in which the rubber is applied high shearing force, is combined with 150 parts of carbon black to obtain the rubber compositions in Examples 14 to 16. 100 Parts of the rubber prepared in Examples 12 and 13, in which the rubber is applied high shearing force, is combined with 200 parts of carbon black to obtain the rubber compositions in Examples 17 to 18. Processability and properties of the rubber compounds vulcanized with the organic peroxide type vulcanizer were evaluated. The results are shown in Tables 5 and 6.

In Comparative Examples 8 and 10, the hydrogenated NBR prepared in Comparative Example 1 was used. In Comparative Examples 9 and 11, the hydrogenated NBR having a Mooney viscosity 65 (Zetpol 2010L, bound nitrile content 36%, indine value 11, supplied by Nippon Zeon Co.) was used.

TABLE 5

| | Comp. Examples | | Examples | | |
|---|---|---|---|---|---|
| | 8 | 9 | 14 | 15 | 16 |
| Composition | | | | | |
| Rubber | 100 | 100 | 100 | 100 | 100 |
| Carbon black SRF | 150 | 150 | 150 | 150 | 150 |
| Peroximon F40 | 5 | 5 | 5 | 5 | 5 |
| Mooney viscosity (100° C., $ML_{1+4}$) | | | | | |
| Before Mooney reduction treatment | 78 | * | 113 | 113 | 113 |
| Mooney viscosity after 30 days standing | 68 | 65 | 71 | 57 | 26 |
| Processability | | | | | |
| Power consumption at Banbury kneading (kw) | 8.3 | 7.8 | 7.2 | 6.6 | 5.9 |
| Roll distance at bagging (mm) | 1.5 | 2.0 | 3.5 | 3.5 | 4.0 |
| Roll milling | D | D | B | B | B |

TABLE 5-continued

|  | Comp. Examples | | Examples | | |
|---|---|---|---|---|---|
|  | 8 | 9 | 14 | 15 | 16 |
| Tensile properties |  |  |  |  |  |
| Tensile stress (kgf/cm$^2$) | 225 | 214 | 256 | 238 | 225 |
| Elongation (%) | 100 | 130 | 120 | 120 | 120 |
| 100% tensile stress (kgf/cm$^2$) | 180 | 186 | 234 | 217 | 200 |
| Hardness (JISA) | 91 | 92 | 92 | 92 | 91 |

TABLE 6

|  | Comp. Examples | | Examples | |
|---|---|---|---|---|
|  | 10 | 11 | 17 | 18 |
| Composition |  |  |  |  |
| Rubber | 100 | 100 | 100 | 100 |
| Carbon black SRF | 200 | 200 | 200 | 290 |
| Peroximon F-40 | 5 | 5 | 5 | 5 |
| Mooney viscosity (100° C., ML$_{1+4}$) |  |  |  |  |
| Before Mooney reduction treatment | 78 | * | 113 | 113 |
| Mooney viscosity after 30 days standing | 68 | 65 | 57 | 26 |
| Processability |  |  |  |  |
| Power consumption at Banbury kneading (kw) | n.k.** | n.k.** | 7.1 | 6.9 |
| Roll distance at bagging (mm) |  |  | 2.0 | 2.5 |
| Roll milling |  |  | B | B |
| Tensile properties |  |  | 198 | 192 |
| Tensile stress (kgf/cm$^2$) | — | — | 90 | 100 |
| Elongation (%) | — | — | 154 | 148 |
| 100% tensile stress (kgf/cm$^2$) | — | — | 167 | 152 |
| Hardness (JISA) | — | — | 95 | 96 |

*n.k.: Since the composition changed into powders, it was impossible to kneaded by Banbury mixer As shown in Tables 5 and 6, the rubber obtained by applying a high shearing force.according to the invention has good processability even when a salient amount of carbon black is added, and has good vulcanization properties.

EXAMPLES 19 to 21 AND COMPARATIVE EXAMPLES 12 AND 13

The hydrogenated NBR prepared in Example 5 (LZP-2) and another hydrogenated NBR prepared in Example 6 (LZP-3) were respectively mixed with the commercially available hydrogenated NBR (Zetpol 2020, bound acrylonitrile content 36%, iodine value 28, Mooney viscosity 78, supplied by Nippon Zeon Co.). The processability and properties of the rubber vulcanized with the sulfur type vulcanizer were evaluated.

For comparison, the processability and the properties of the vulcanizate of a rubber mixture comprising the hydrogenated NBR prepared in Comparative Example 3 and the commercially available hydrogenated NBR (Zetpol 2020 or Zetpol 2020L) were similarly evaluated. The results are shown in Table 7.

TABLE 7

|  |  | Examples | | Comp. Examples | | Example |
|---|---|---|---|---|---|---|
| Rubber | Mooney viscosity | 19 | 20 | 12 | 13 | 21 |
| ZP2020 | 78 | 70 | 50 | 50 | — | — |
| ZP2020L | 57 | — | — | — | 95 | 95 |
| LZP-1 | 54(30 days after) | — | — | 50 | 5 | — |
| LZP-2 | 41(30 days after) | — | 50 | — | — | — |
| LZP-3 | 16(30 days after) | 30 | — | — | — | 5 |
| Composition |  |  |  |  |  |  |
| Zinc oxide |  | 5 | 5 | 5 | 5 | 5 |
| Stearic acid |  | 1 | 1 | 1 | 1 | 1 |
| Carbon black FEF |  | 50 | 50 | 50 | 50 | 50 |
| Aging inhibitor 1 |  | 1.5 | 1.5 | 1.5 | 1.5 | 1.5 |
| Aging inhibitor 2 |  | 1.5 | 1.5 | 1.5 | 1.5 | 1.5 |
| Sulfer |  | 0.5 | 0.5 | 0.5 | 0.5 | 0.5 |
| Vulcanization accelerator 1 |  | 1.5 | 1.5 | 1.5 | 1.5 | 1.5 |
| Vulcanization accelerator 2 |  | 0.5 | 0.5 | 0.5 | 0.5 | 0.5 |
| Mooney viscosity (100° C., ML$_{1+4}$) |  |  |  |  |  |  |
| Polymer Mooney viscosity |  | 54 | 56 | 58 | 56 | 55 |
| Compound Mooney viscosity |  | 63 | 65 | 69 | 70 | 71 |
| Processability |  |  |  |  |  |  |
| Power consumption at Banbury kneading (kw) |  | 7.1 | 7.4 | 8.0 | 8.9 | 8.8 |
| Roll milling |  | A | A | B | B | A |
| Roll distance at bagging (mm) |  | 4.0 | 3.5 | 3.0 | 2.5 | 2.5 |
| Garvey die extrusion |  |  |  |  |  |  |
| g/min (average of n = 4) |  | 39.7 | 46.8 | 34.3 | 31.7 | 32.5 |
| cm/min (average of n = 4) |  | 65.3 | 68.9 | 65.3 | 62.2 | 64.3 |
| Swell (%) |  | 92.5 | 89.3 | 86.5 | 76.8 | 78.9 |
| Edge |  | 3 | 4 | 3 | 2 | 3 |
| Corner |  | 4 | 4 | 3 | 3 | 3 |
| Surface texture |  | 4 | 4 | 3 | 3 | 4 |
| Shape |  | 4 | 4 | 3 | 4 | 4 |
| Total |  | 15 | 16 | 12 | 12 | 14 |
| Tensile properties |  |  |  |  |  |  |
| Tensile stress (kgf/cm$^2$) |  | 268 | 265 | 261 | 252 | 255 |
| Elongation (%) |  | 510 | 520 | 500 | 510 | 520 |
| 100% tensile stress (kgf/cm$^2$) |  | 30 | 28 | 27 | 27 | 27 |
| 300% tensile stress (kgf/cm$^2$) |  | 118 | 118 | 112 | 116 | 118 |

As seen from Table 7, a mixture of a commercially available hydrogenated NBR with the rubber obtained by the application of high shearing force according to the invention also exhibits an enhanced processability.

EXAMPLES 22 to 27 AND COMPARATIVE EXAMPLES 14 TO 16

Each of the hydrogenated NBR prepared in Example 12 (LZP-4, Mooney viscosity 57) and the hydrogenated NBR prepared in Example 13 (LZP-5, Mooney viscosity 26) was mixed together with a commercially available ethylenically saturated copolymer rubber (EPDM Keltan 4778F, iodine value 18, Mooney viscosity 64, Idemitsu Petrochemical Co.) to obtain a rubber mixture. Processability and properties of the rubber vulcanized with an organic peroxide vulcanizer were evaluated.

Further, a mixture of LZP-5 with a hydrogenated NBR (Zetpol 2010, bound acrylonitrile content 36%, iodine value 11, supplied by Nippon Zeon Co.) was prepared, and the evaluation was conducted in a similar manner.

For comparison, by using the hydrogenated NBR prepared in Comparative Example 3 (LZP-1, Mooney viscosity 54), a rubber mixture was prepared and evaluated in a similar manner. The evaluation results are shown in Table 8 and Table 9.

TABLE 8

|  | Examples ||| Comp. Examples |||
| --- | --- | --- | --- | --- | --- | --- |
|  | 22 | 23 | 24 | 14 | 15 | 16 |
| LZP-4 | 30 | 50 | 70 | — | — | — |
| Zp2010 | — | — | — | — | 50 | 100 |
| EPDM (Idemitsu Keltan 4778F) | 70 | 50 | 30 | 100 | 50 | — |
| Stearic acid | 1 | 1 | 1 | 1 | 1 | 1 |
| Carbon black SRF | 40 | 40 | 40 | 40 | 40 | 40 |
| Vul-Cup 40KE | 3 | 3 | 3 | 3 | 3 | 3 |
| Roll milling | B | A | A | C | C | C |
| Tensile properties |  |  |  |  |  |  |
| Tensile stress (kgf/cm$^2$) | 234 | 248 | 263 | 241 | 232 | 277 |
| Elongation (%) | 290 | 380 | 390 | 220 | 310 | 430 |
| 100% tensile stress (kgf/cm$^2$) | 48 | 45 | 52 | 58 | 54 | 36 |
| 200% tensile stress (kgf/cm$^2$) | 153 | 148 | 168 | 205 | 154 | 113 |
| Hardness Share A | 75 | 73 | 74 | 76 | 73 | 68 |

TABLE 9

|  | Examples |||
| --- | --- | --- | --- |
|  | 25 | 26 | 27 |
| LZP-5 | 10 | 10 | 10 |
| Zp2010 | 20 | 40 | 60 |
| EPDM (Idemitsu Keltan 4778F) | 70 | 50 | 30 |
| Stearic acid | 1 | 1 | 1 |
| Carbon black SRF | 40 | 40 | 40 |
| Vul-Cup 40KE | 3 | 3 | 3 |
| Roll milling | B | B | B |
| Tensile stress (kgf/cm$^2$) | 222 | 243 | 238 |
| Elongation (%) | 270 | 320 | 310 |
| 100% tensile stress (kgf/cm$^2$) | 51 | 49 | 47 |
| 200% tensile stress (kgf/cm$^2$) | 152 | 157 | 148 |
| Hardness Share A | 76 | 73 | 73 |

As seen from Table 8 and Table 9, a mixture of the coppolymer rubber obtained by the application of high shearing force according to the invention, with a commercially available ethylenically saturated-type copolymer rubber also exhibits an enhanced processability.

EXAMPLES 28 TO 30 AND COMPARATIVE EXAMPLES 17 TO 19

The hydrogenated NBR prepared in Example 5 (LZP-2, Mooney viscosity 41) was mixed with a commercially available polyacrylate ester copolymer rubber (AR71, Mooney viscosity 50, supplied by Nippon Zeon Co.), and processability and properties of the rubber mixture as vulcanized with an organic peroxide vulcanizer were evaluated. The vulcanization was conducted at 170° C. for 20 minutes. For comparison, by using the hydrogenated NBR prepared in Comparative Example 3 (LZP-1, Mooney viscosity 54), a rubber mixture was prepared and evaluated in a similar manner. The results are shown in Table 10.

TABLE 10

|  | Examples ||| Comp. Examples |||
| --- | --- | --- | --- | --- | --- | --- |
|  | 28 | 29 | 30 | 17 | 18 | 19 |
| LZP-2 | 30 | 50 | 70 | — | — | — |
| LZP-1 | — | — | — | — | 50 | 100 |
| AR | 70 | 50 | 30 | 100 | 50 | — |
| Stearic acid | 1 | 1 | 1 | 1 | 1 | 1 |

TABLE 10-continued

|  | Examples ||| Comp. Examples |||
| --- | --- | --- | --- | --- | --- | --- |
|  | 28 | 29 | 30 | 17 | 18 | 19 |
| Carbon black SRF | 50 | 50 | 50 | 50 | 50 | 50 |
| Vul-Cup 40KE | 5 | 5 | 5 | 5 | 5 | 5 |
| Nauguard 445 | 1 | 1 | 1 | 1 | 1 | 1 |
| Roll milling | B | B | A | D | D | C |
| Vulcanization properties |  |  |  |  |  |  |
| Tensile stress (kgf/cm$^2$) | 174 | 182 | 201 | 103 | 135 | 226 |
| Elongation (%) | 360 | 350 | 370 | 280 | 260 | 390 |
| 100% tensile stress (kgf/cm$^2$) | 36 | 35 | 38 | 25 | 32 | 36 |
| 200% tensile stress (kgf/cm$^2$) | 73 | 86 | 138 | 53 | 72 | 146 |
| Hardness, Shore A | 66 | 68 | 67 | 66 | 68 | 70 |

As seen from Table 10, a mixture of the copolymer rubber obtained by the application of high shearing force according to the invention, with a commercially available polyacrylate ester copolymer rubber also exhibits an enhanced processability.

EXAMPLES 31, 32 AND COMPARATIVE EXAMPLE 20 TO 22

Each of the hydrogenated NBR prepared in Example 9 (LZP- 6) and the hydrogenated NBR prepared in Example 10 (LZP-7) was mixed with commercially available fluororubber (Tecnoflon 710, Mooney viscosity 50, supplied by Nippon Zeon); and processability and properties of the vulcanizate were evaluated in a similar manner.

For comparison, by using each of the hydrogenated NBR prepared in Comparative Example 3 (LZP-1, Mooney viscosity 54) and a commercially available NBR (ZP2010, bound acrylonitrile content 36%, iodine value 11, Mooney viscosity 85, supplied by Nippon Zeon Co.), a rubber mixture was prepared and evaluated in a similar manner. The evaluation results are shown in Table 11.

The recipe (recipe A) containing the fluororubber and recipe (recipe B) containing.the highly saturated nitrile group-containing copolymer rubber are as follows.

Recipe A

| Tecnoflon P710 | 100 parts |
| --- | --- |
| Thermax MT | 30 parts |
| Zinc oxide #1 | 3 parts |
| TAIC | 3 parts |
| Perhexa 25B-40 | 3 parts |

Recipe B

| HNBR | 100 parts |
| --- | --- |
| SRF carbon black | 50 parts |
| Nocrac MBZ | 1.5 parts |
| Nauguard | 1.5 parts |
| Vul-Cup: 40 KE | 6 parts |

TABLE 11

| Polymer | | Comp. Examples | | | Examples | |
|---|---|---|---|---|---|---|
| | | 20 | 21 | 22 | 31 | 32 |
| Fluororubber | | | | | | |
| Composition | P710 | 100 | 70 | 70 | 70 | 70 |
| HNBR Composition | ZP2010 | — | 30 | — | — | — |
| | LZP-1 | — | — | 30 | — | — |
| | LZP-6 | — | — | — | 30 | — |
| | LZP-7 | — | — | — | — | 30 |
| Roll milling | | C | C | C | B | B |
| Curastometer test | | | | | | |
| MH ($V_{max}$) (kg · cm) | | 50 | 53 | 52 | 55 | 54 |
| ML ($V_{min}$) (kg · cm) | | 11 | 9 | 8 | 8 | 8 |
| T5 (min) | | 1.3 | 1.6 | 1.7 | 1.6 | 1.6 |
| T95 (min) | | 9.1 | 13.4 | 13.6 | 13.2 | 13.6 |
| Tensile properties | | | | | | |
| Tensile stress (kgf/cm$^2$) | | 187 | 189 | 178 | 205 | 198 |
| Elongation (%) | | 240 | 190 | 180 | 240 | 250 |
| 100% tensile stress (kgf/cm$^2$) | | 47 | 84 | 78 | 49 | 56 |
| 200% tensile stress (kgf/cm$^2$) | | 150 | — | — | 166 | 156 |
| Hardness (JISA) | | 66 | 73 | 72 | 68 | 67 |
| Garvey die extrusion | | | | | | |
| g/min (average of n = 4) | | 67.3 | 57.4 | 56.3 | 60.3 | 62.8 |
| cm/min (average of n = 4) | | 106.8 | 115.3 | 118.4 | 123.7 | 133.1 |
| Swell (%) | | 46.4 | 48.3 | 51.2 | 53.5 | 53.2 |
| Edge | | 3 | 3 | 3 | 3 | 3 |
| Corner | | 2 | 2 | 3 | 3 | 4 |
| Surface texture | | 2 | 2 | 3 | 4 | 4 |
| Shape | | 1 | 3 | 3 | 4 | 4 |
| Total | | 9 | 10 | 12 | 14 | 15 |

EXAMPLES 33 TO 35 AND COMPARATIVE EXAMPLES 23 TO 26

The hydrogenated NBR prepared in Example 10 (LZP-8) was mixed with each of commercially available polyether rubber (Gechron 2000, Mooney viscosity 96, Nippon Zeon Co.) and a high-tenacity elastomer composition comprising hydrogenated NBR and zinc dimethacrylate (ZSC 2295, Mooney viscosity 85, Nippon Zeon Co.). Processability of the rubber mixture and the properties of the vulcanizate were similarly evaluated.

For comparison, by using the hydrogenated NBR prepared in Comparative Example 3 (LZP-1, Mooney viscosity 54), a rubber mixture was prepared and evaluated in a similar manner. The evaluation results are shown in Table 12.

The recipe (recipe C) containing the polyether rubber (Gechron) and the recipe (recipe D) containing the highly saturated nitrile group-containing copolymer rubber (HNBR) are as follows. The recipe containing LZP-8 and ZSC 2295 comprises 35 parts of LZP-8, 65 parts of HNBR and Vul-Cup 40KE (organic peroxide vucanizing agent).

Recipe C

| Gechron | 100 parts |
|---|---|
| Carplex 1120 | 40 parts |
| Magnesium oxide #150 | 10 parts |
| Gleck G-8208 | 1 part |
| Nauguard 445 | 1.5 parts |
| Nocrac 224 | 1.5 parts |
| Zisnet | 0.9 parts |

Recipe D

| HNBR | 100 parts |
|---|---|
| Carplex 1120 | 40 parts |
| Magnesium oxide #150 | 10 parts |
| Gleck G-8208 | 1 part |
| Nauguard 445 | 1.5 parts |
| Nocrac 224 | 1.5 parts |
| Vul-Cup | 7 parts |

TABLE 12

| | Comp. Ex. | Example | Comp. Ex. | Examples | | Comp Ex. |
|---|---|---|---|---|---|---|
| Polymer | 23 | 24 | 33 | 25 | 34 | 35 | 26 |
| Rubber | | | | | | | |
| Gechron 2000 | 100 | 70 | 70 | 30 | 30 | — | — |
| LZP-1 | — | 30 | — | 70 | — | — | — |
| LZP-8 | — | — | 30 | — | 70 | 35 | 35 |
| ZSC2295 | — | — | — | — | — | 65 | 65 |
| Roll milling | C | C | A | C | A | A | A |
| Curastometer test | | | | | | | |
| MH ($V_{max}$) (kg · cm) | — | — | — | — | — | 42.2 | 39.2 |
| ML ($V_{min}$) (kg · cm) | — | — | — | — | — | 1.6 | 1.6 |
| T10 (min) | — | — | — | — | — | 1.1 | 1.1 |
| T90 (min) | — | — | — | — | — | 12.1 | 12.3 |
| Tensile properties | | | | | | | |
| Tensile stress (kgf/cm$^2$) | 92 | 168 | 183 | 118 | 137 | 489 | 460 |
| Elongation (%) | 290 | 480 | 420 | 310 | 330 | 490 | 500 |
| 100% tensile stress (kgf/cm$^2$) | 47 | 32 | 42 | 39 | 43 | 70 | 67 |
| 200% tensile stress (kgf/cm$^2$) | 68 | 53 | 58 | 68 | 72 | — | — |
| 300% tensile stress (kgf/cm$^2$) | — | 74 | 86 | 94 | 99 | 245 | 210 |
| Hardness (JISA) | 72 | 68 | 69 | 63 | 64 | 83 | 83 |
| Garvey die extrusion (barrel temp. = 60° C., die temp. = 80° C., No. of revolution = 50 rpm) | | | | | | | |

TABLE 12-continued

|  | Comp. Ex. | Example | Comp. Ex. | Examples | | Comp Ex. |
|---|---|---|---|---|---|---|
| Polymer | 23  24 | 33 | 25 | 34 | 35 | 26 |
| g/min (average of n = 4) | 32.5  33.5 | 45.0 | 35.3 | 52.5 | — | — |
| cm/min (average of n = 4) | 52.8  54.0 | 63.0 | 55.0 | 67.0 | — | — |
| Swell (%) | 89.0  86.5 | 87.5 | 82.0 | 89.5 | — | — |
| Edge | 3  3 | 4 | 3 | 4 | — | — |
| Corner | 3  3 | 4 | 3 | 4 | — | — |
| Surface texture | 3  3 | 4 | 3 | 4 | — | — |
| Shape | 2  4 | 4 | 3 | 4 | — | — |
| Total | 11  13 | 16 | 12 | 16 | — | — |

As seen from Table 11 and Table 12, a mixture of the copolymer rubber obtained by the application of high shearing force according to the invention, with a commercially available polyether rubber, fluororubber or a high tenacity elastomer composition containing zinc methacrylate also exhibits an enhanced processability.

EXAMPLE 36 AND COMPARATIVE EXAMPLE 27

Using each of the hydrogenated NBR prepared in Example 5 (LZP-2, Mooney viscosity 41) and the hydrogenated NBR prepared in Comparative Example 3 (LZP-1, Mooney viscosity 54), adhesion of the HNBR with various fibers was tested. The results are shown in Table 14. The rubber of the invention LZP-2 (100 parts by weight) was incorporated with the components used in Example 19, and kneaded on a roll to prepare a rubber sheet with a thickness of about 2.5 mm. The fibers used were treated with an adhesive composition comprising RFL liquid containing a latex of hydrgenated NBR (iodine value 15, average particle diameter 0.10 1m, solid content 40% by weight, pH 10.5), and then adhered to the hydrogenated NBR and the rubber/fiber composite was vulcanized. The recipe of the adhesive composition comprising the RFL liquid is shown in Table 13.
(RF Liquid)

| Resorcinol | 11.0 parts |
|---|---|
| Formalin (37%) | 16.2 parts |
| Sodium hydroxide (10%) | 3.0 parts |
| Water | 235.8 parts |
| Total | 266.0 parts |

(RFL Liquid)

| Latex | 250.0 parts |
|---|---|
| RF liquid | 266.0 parts |
| Aq. ammonia | 22.6 parts |
| Water | 47.9 parts |
| Total | 586.5 parts |

The fibers were immersed in the adhesive composition by using a testing single cord dip machine to prepare treated cords. The kinds of the fibers and the treating procedures thereof are as follows.

Nylon cord (6-nylon, constitution 1260D/2) and rayon cord (3-Super, constitution 1650D/2) were treated with the adhesive composition to prepare cords for high-tenacity rubber articles.

Polyester cord (polyethylene terephthalate, constitution 1500D/2127T/m) was immersed in a pre-treating liquid having the following composition, heat-treated at 220° C. for 2 minutes, immersed in the RFL liquid, and then, heat-treated at 230° C. for 1 minute to prepare cord for high-tenacity rubber articles.
Composition of Pretreatment Solution

| Diglycidylether of glycerine | 2.22 parts by weight |
|---|---|
| 10% NaOH solution | 0.28 parts by weight |
| 5% "AEROSOL" OT (75% of solids content) * | 0.56 parts by weight |
| Water | 96.94 parts by weight |
| Total | 100.00 parts by weight |

* produced by Nippon Aerosil Inc.

Glass fiber cord (ECG150 3/10 20S constitution) was immersed in an aqueous 5% dispersion of á-aminopropyl-triethoxysilane, heat-treated at 150° C. for 3 minutes, immersed in the RFL liquid, and then, heat-treated 200° C. for 1 minute to prepare cord for high-tenacity rubber articles.

Each of the thus-prepared cords was embedded in the rubber composition at an embedded length of 8 mm, and the cord-embedded rubber composition was vulcanized at a press pressure of 5 MPa and a temperature of 150° C. for 30 minutes to obtain a rubber/fiber composite.

A cord drawing test was conducted on each rubber/fiber composite according to ASTM D2138-72 and other standards to determine the initial adhesion each cord also was heat-treated in an air oven at 120° C. for 168 hours, and then, a cord drawing test was similarly conducted to evaluate the heat-resistant adhesion. The evaluation results are shown in Table 14.

TABLE 14

|  | Example 36 | Comp. ex. 27 |
|---|---|---|
| Composition | | |
| LZP-2 | 100 | — |
| LZP-1 | — | 100 |
| ZnO#1 | 5 | 5 |
| Stearic acid | 1 | 1 |
| Carbon black | 40 | 50 |
| Peroximon F-40 | 6 | 6 |
| Fiber (canvas) adhesion | | |
| Nylon | | |
| Peel strength (N/25 mm) | 360 | 310 |
| Peel site | Rubber rupture | Rubber rupture |

TABLE 14-continued

|  | Example 36 | Comp. ex. 27 |
|---|---|---|
| Rayon | | |
| Peel strength (N/25 mm) | 340 | 300 |
| Peel site | Rubber rupture | Rubber rupture |
| Polyester | | |
| Peel strength (N/25 mm) | 320 | 290 |
| Peel site | Rubber rupture | Rubber rupture |
| Aramid fiber | | |
| Peel strength (N/25 mm) | 320 | 290 |
| Peel site | Rubber rupture | Rubber rupture |
| Glass fiber | | |
| Peel strength (N/25 mm) | 330 | 280 |
| Peel site | Rubber rupture | Rubber rupture |

As seen Table 14, the composite of the highly saturated nitrile group-containing copolymer rubber of the invention with a fiber has improved adhesion.

INDUSTRIAL APPLICABILITY

By conducting the high-shearing-force applying treatment in the presence of an aging inhibitor according to the present invention, a highly saturated nitrile group-containing copolymer rubber having a lowered Mooney viscosity and exhibiting an enhanced processability can be obtained. The viscosity of the low-Mooney-viscosity highly saturated nitrile group-containing copolymer rubber changes only to a minor extent with the lapse of time, and thus, the copolymer rubber has excellent storage stability.

The highly saturated nitrile group-containing copolymer rubber with an enhanced processability can be combined with various fibers to form composites. When a combination of the copolymer rubber with a reinforcing fiber is used, for example, as a transmission belt such as a V-belt or a toothed belt, the rubber thoroughly penetrates into and fills voids among the fibers to give a fiber-reinforced rubber structure having an excellent mechanical strength. The copolymer rubber/fiber composite is suitable for a belt which is used under conditions such that it is subject to repeated flexural distortions in the air or an oil at a high temperature. Such belts include, for example, a power transmission belt such as a timing belt, and a conveyor belt.

By incorporating various heat-resistant rubbers with the highly saturated nitrile group-containing copolymer rubber, a heat-resistant rubber composition having an enhanced processability can be obtained.

What is claimed is:

1. A highly saturated nitrile group-containing copolymer rubber having a Mooney viscosity lowered by 15 points or more by applying a shearing force at a shearing rate of from 500 to 5,000 $S^{-1}$ thereto in the presence of 1 to 10 parts by weight, based on 100 parts by weight of the highly saturated nitrile group-containing copolymer rubber, of an aging inhibitor at a temperature of from 180° C. to 380° C., which has a Mooney viscosity of from 5 to 135 and a ratio of weight average molecular weight (Mw) to number average molecular weight (Mn) of 3 to 5, and exhibits an increase in Mooney viscosity of 10 points or fewer while the rubber is allowed to stand in the air at room temperature for 30 days after the above-lowering of Mooney viscosity, said copolymer rubber being a hydrogenation product of a copolymer comprising ethylenically unsaturated nitrile monomer units, diene monomer units and optional copolymerizable monomer units wherein the content of the ethylenically unsaturated nitrile monomer units in the copolymer is in the range of 10 to 60% by weight, said copolymer rubber having an iodine value of not larger than 120 as measured before applying the high shearing force, and said aging inhibitor being at least one member selected from the group consisting of aromatic secondary amine-containing, amine-ketone-containing, mercaptobenzoimidazole-containing, bisphenol-containing, monophenol-containing, thiobisphenol-containing, hydroquinone-containing, nickel salt-containing, thiourea-containing, thioether-containing and phosphorus-containing aging inhibitors.

2. The highly saturated nitrile group-containing copolymer rubber according to claim 1, wherein the highly saturated nitrile group-containing copolymer rubber has a Mooney viscosity of from 20 to 90.

3. The highly saturated nitrile group-containing copolymer rubber according to claim 1, wherein the highly saturated nitrile group-containing copolymer rubber exhibits an increase in Mooney viscosity of 5 points or fewer while the rubber is allowed to stand in the air at room temperature for 30 days after the above-lowering of Mooney viscosity.

4. A process for producing a highly saturated nitrile group-containing copolymer rubber having a low Mooney viscosity, wherein a shearing force at a shearing rate of from 500 to 5,000 $S^{-1}$ is applied to a highly saturated nitrile group-containing copolymer rubber having an iodine value of not larger than 120 to lower the Mooney viscosity thereof, said copolymer rubber being a hydrogenation product of a copolymer comprising ethylenically unsaturated nitrile monomer units, diene monomer units and optional copolymerizable monomer units wherein the content of the ethylenically unsaturated nitrile monomer units in the copolymer is in the range of 10 to 60% by weight, characterized in that the application of shearing force is carried out in the presence of 1 to 10 parts by weight, based on 100 parts by weight of the highly saturated nitrile group-containing copolymer rubber, of an aging inhibitor at a temperature of from 180° C. to 380° C., wherein said aging inhibitor is at least one member selected from the group consisting of aromatic secondary amine-containing, amine-ketone-containing, mercaptobenzoimidazole-containing, bisphenol-containing, monophenol-containing, thiobisphenol-containing, hydroquinone-containing, nickel salt-containing, thiourea-containing, thioether-containing and phosphorus-containing aging inhibitors.

5. The process for producing a highly saturated nitrile group-containing copolymer rubber according to claim 4, wherein the high shearing force is applied in the presence of from 1 to 10 parts by weight, based on 100 parts by weight of the highly saturated nitrile group-containing copolymer rubber, of at least one aging inhibitor selected from the group consisting of aromatic secondary amine-containing aging inhibitors, amine-ketone-containing aging inhibitors which are a condensation product of an aromatic amine with a ketone, mercaptobenzoimidazole-containing aging inhibitors and bisphenol-containing aging inhibitors.

6. The process for producing a highly saturated nitrile group-containing copolymer rubber according to claim 4, wherein the shearing force is applied to a highly saturated nitrile group-containing copolymer rubber having a Mooney viscosity of from 60 to 150 to lower the Mooney viscosity by 15 points or more whereby a highly saturated nitrile group-containing copolymer rubber having a Mooney viscosity of from 5 to 135 is obtained.

7. The process for producing a highly saturated nitrile group-containing coppolymer ruvver according to claim 4, wherein the shearing force is applied to a highly saturated nitrile group-containing copolymer rubber having a Mooney viscosity of from 60 to 150 to lower the Mooney viscosity by 30 points or more whereby a highly saturated nitrile group-containing copolymer rubber having a Mooney viscosity of from 20 to 90 is obtained.

8. The process for producing a highly saturated nitrile group-containing copolymer rubber according to claim 4, wherein the application of a shearing force is carried out substantially in the absence of an oxygen donor.

9. The process for producing a highly saturated nitrile group-containing copolymer rubber according to claim 4, wherein the highly saturated nitrile group-containing copolymer rubber produced by the application of a shearing force has a ratio of weight average molecular weight (Mw) oto number average molecular weight (Mn) of 3 to 5, and exhibits an increase in Mooney viscosity of 10 points or fewer while the rubber is allowed to stand in the air at room temperature for 30 days after the above-lowering of Mooney viscosity.

10. The process for producing a highly saturated nitrile group-containing copolymer rubber according to claim 4, wherein the application of a shearing force is carried out at a temperature of from 240 to 320° C. by using an extruder having a plurality of barrels.

11. A heat-resistant rubber composition comprising the highly saturated nitrile group-containing copolymer rubber as claimed in claim 1, and a heat-resistant rubber, characterized in that the amount of the highly saturated nitrile group-containing copolymer rubber is at least 5% by weight.

12. The heat-resistant rubber composition according to claim 11, wherein the heat-resistant rubber is at least one rubber selected from nitrile group-containing unsaturated copolymer rubbers and hydrogenation products thereof, ethylenically saturated copolymer rubbers, polyacrylate ester rubbers, polyether rubbers and fluororubbers.

13. A rubber/fiber composite comprised of the highly saturated nitrile group-containing copolymer rubber as claimed in claim 1 with a fiber.

14. The rubber/fiber composite according to claim 13, which is prepared by incorporating a fiber, which has been treated with a mixture of an aqueous solution of a precondensate of resocinol with formaldehyde, and a rubber latex, in the highly saturated nitrile group-containing copolymer rubber, and vulcanizing the copolymer rubber having incorporated therein the fiber.

* * * * *